United States Patent [19]

Terrat

[11] 4,261,741
[45] Apr. 14, 1981

[54] ANTIFRICTION ALLOY

[75] Inventor: Jean-Paul Terrat, Saint-Etienne, France

[73] Assignee: Centre Stephanois de Recherches Mecaniques Hydromecanique et Frottement, Andrezieux-Boutheon, France

[21] Appl. No.: 954,832

[22] Filed: Oct. 26, 1978

[30] Foreign Application Priority Data

Nov. 7, 1977 [FR] France ............... 77 33360

[51] Int. Cl.³ .................. C22C 27/04; C22C 30/00
[52] U.S. Cl. .................. 75/134 F; 75/134 H; 75/176; 75/231
[58] Field of Search ......... 75/230, 231, 176, 134 H, 75/231, 134 F

[56] References Cited

U.S. PATENT DOCUMENTS

| 2,945,291 | 7/1960 | Ankeny et al. | 75/231 |
| 3,008,225 | 11/1961 | Healy | 75/231 |
| 3,479,289 | 11/1969 | Van Wyk | 75/231 |
| 3,918,923 | 11/1975 | Inoue | 75/231 |

FOREIGN PATENT DOCUMENTS

| 1942702 | 6/1971 | Fed. Rep. of Germany | 75/231 |
| 747662 | 4/1956 | United Kingdom | 75/231 |
| 807909 | 1/1959 | United Kingdom | 75/231 |
| 358401 | 1/1973 | U.S.S.R. | 75/231 |

OTHER PUBLICATIONS

Mizutani, "Formation of Molybdenum Sulfide in Fe—Mo-S Alloys and Its Effect on Frictional Property", *Metals Abstracts*, Apr., 1977, p. 6 43.

*Primary Examiner*—Peter K. Skiff
*Attorney, Agent, or Firm*—Young & Thompson

[57] ABSTRACT

An antifriction alloy containing iron, molybdenum and sulphur, and having a low coefficient of friction, even in the dry state, is disclosed. The alloy contains 8.0–26.6% iron, 41.0–62.5% molybdenum and 23.3–40.5% sulphur. The alloy may comprise a matrix of $Fe_xMo_{3+y}S_4$, where x and y are less than 1. (e.g. $FeMo_4S_5$) in which is dispersed $FeMo_2S_4$ and/or the $\epsilon$ phase of the Fe/Mo/S equilibrium diagram. The alloy reacts with a material against which it rubs, to form the sulphide of that material on the rubbed surface. The alloy may be made by chemical reaction, fusion, vacuum deposition, or powder metallurgy. It can be used alone, or as a surface layer on, or inclusion in, another material, or it can be dispersed as a powder in a lubricant.

7 Claims, 4 Drawing Figures

ANTIFRICTION ALLOY

BACKGROUND OF THE INVENTION

1. Field of the Invention

The present invention relates to an antifriction alloy based on iron, molybdenum and sulphur.

2. Description of the Prior Art

The compositions of this type proposed hitherto are not entirely satisfactory; they cannot be satisfactorily and completely freed from the restrictions of conventional lubrication, in particular oil or grease, and this is particularly disadvantageous in certain fields such as chemical engineering, aerospace, textiles, etc.; further, in difficult lubrication conditions, they do not guarantee very low coefficients of friction.

In particular, these materials based on iron, molybdenum and sulphur give no better results than solid lubricants such as molybdenum bisulphide, tungsten biselenide, graphite, etc., or plastics, all of which are products with extremely limited applications, since these solid lubricants are difficult to use, whereas plastics lose their properties at elevated temperatures.

SUMMARY OF THE INVENTION

The present invention relates to an antifriction alloy based on iron, molybdenum and sulphur, the composition of which results in excellent properties and, in particular, the entire mass having, even in the dry state, a very low coefficient of friction.

According to one aspect of the invention, the antifriction alloy has a composition by weight of its constituents within the range:
iron: 8.0% to 26.6%
molybdenum: 41.0% to 62.5%
sulphur: 23.3% to 40.5%

This composition corresponds to an extremely limited zone of the ternary iron/molybdenum/sulphur diagram (less than 5% of the total area of the diagram) and surprisingly permits excellent friction even when dry, with a very low coefficient of friction.

According to another aspect of the invention, the alloy based on iron, molybdenum and sulphur comprises at least one phase dispersed in a crystalline matrix. This crystalline matrix corresponds to the composition $Fe_xMo_{3+y}S_4$, wherein x and y are less than 1, and more particularly to the composition $FeMo_4S_5$.

One of the phases dispersed in this matrix may be the compound $FeMo_2S_4$ or else the phase $\epsilon$ of the equilibrium diagram of iron/molybdenum/sulphur.

According to yet another aspect of the invention, the antifriction alloy based on iron, molybdenum and sulphur is such that it reacts under the effect of friction against an opposed material to form the corresponding sulphide on the surface of the latter.

Preferably, the various aspects of the invention are wholly or partly combined.

According to the invention, the alloy is obtained, in particular, either by a chemical reaction between the iron, molybdenum and sulphur, or by fusion, or by vacuum deposition on a substrate, or by projecting mixtures of powders on to a substrate using a metallising blow-torch. The alloy may be shaped by powder metallurgical methods. It may be incorporated as a charge in a metal matrix or a polymer matrix or in a lubricant.

DESCRIPTION OF THE PREFERRED EMBODIMENTS

Reference will now be made to FIGS. 1 to 4.

The discovery on which the invention is based stems from work done on the friction of ternary alloys containing iron, molybdenum and sulphur. This work showed entirely unexpected behaviour of the alloy compositions which are located inside a very small zone of the ternary iron/molybdenum/sulphur diagram (FIG. 1), as represented by the area ABCDEF (FIGS. 2 and 3), i.e. scarcely 4.8% of the total area of the diagram.

When the material having this composition rubs against certain opposed materials, it covers the opposed material with a layer which, when analysed by X-ray diffraction, proves to consist, for the most part, of the sulphide of the opposed metal. For example, if the opposed metal is iron, it will be coated with iron sulphide, FeS. If it is nickel, it will be coated with nickel sulphide, NiS. As soon as this layer is formed on the opposed metal, within the first few seconds of relative motion, the coefficient of friction even in the dry state reaches a very low level, i.e. less than half that obtained with molybdenum bisulphide, for example.

Figure 1:
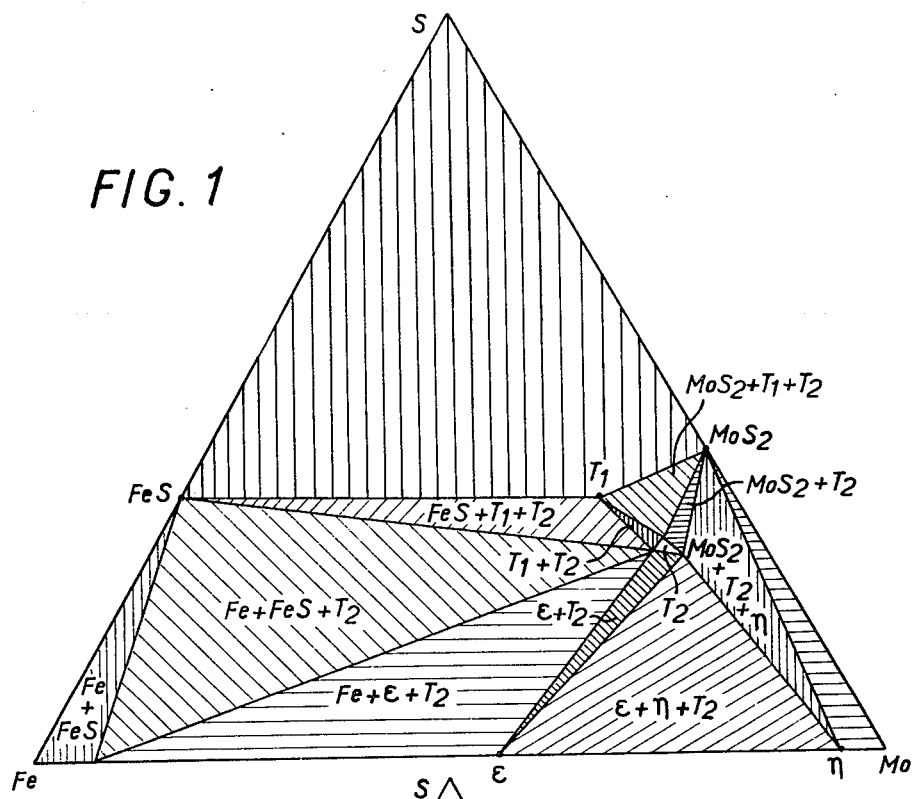
FIG. 1 is the ternary iron/molybdenum/sulphur diagram.
Figure 2:
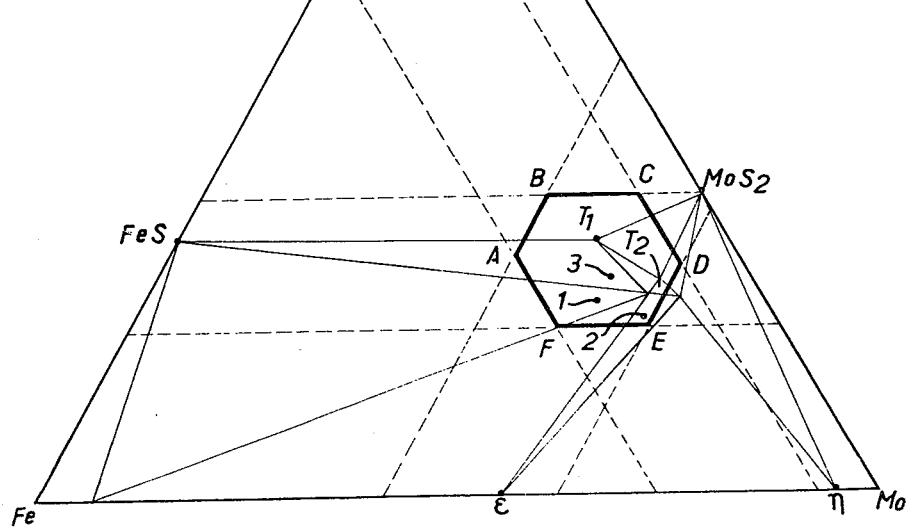
FIG. 2 is a view analogous to FIG. 1 but showing a hexagonal zone corresponding to the compositions according to the invention.
Figure 3:
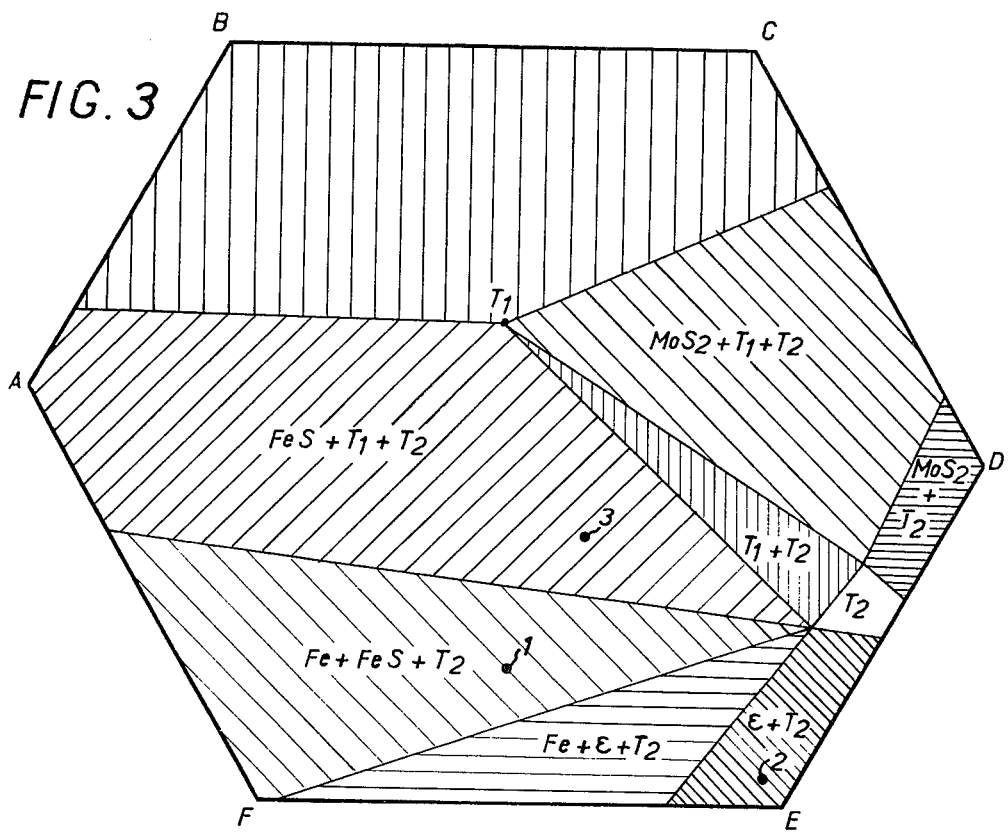
FIG. 3 is a view of this hexagonal zone, on an enlarged scale.

The proportions of iron, molybdenum and sulphur which define the zone ABCDEF are substantially accurately shown in FIGS. 2 and 3. This zone is located inside a hexagon ABCDEF corresponding to the following proportions:
iron: 8.0% to 26.6%
molybdenum: 41.0% to 62.5%
sulphur: 23.3% to 40.5%

The material according to the present invention is a polyphase solid consisting primarily of the compound $T_1=FeMo_2S_4$ and solid solutions corresponding to formula $T_2=Fe_xMo_{3+y}S_4$ (wherein x and y are between 0 and 1). It may also contain variable quantities of intermetallic compound $\epsilon$, which has a fixed composition. However, alloys containing only the phases represented by the point $T_1$, corresponding to the fixed compound $FeMo_2S_4$, and the triangle $T_2$, corresponding to the solid solutions $Fe_xMo_{3+y}S_4$, are also part of the invention.

By a judicious choice of the composition of the material inside the zone ABCDEF, some of its properties, particularly its mechanical characteristics and corrosion resistance, may be fixed at any desired values without in any way affecting its frictional properties. In particular, the presence of the intermetallic compound $\epsilon$ gives the material great hardness and considerably adds to its corrosion resistance, which is then similar to that of molybdenum. Apart from the compound $FeMo_2S_4$ and/or the solid solutions $Fe_xMo_{3+y}S_4$, the material may also contain the compounds FeS and $MoS_2$. FIG. 3 shows the extent of the presence of these different compounds. Even in the dry state, the coefficient of friction remains very low and much lower than that obtained with iron sulphide or molybdenum sulphide alone.

Figure 4:
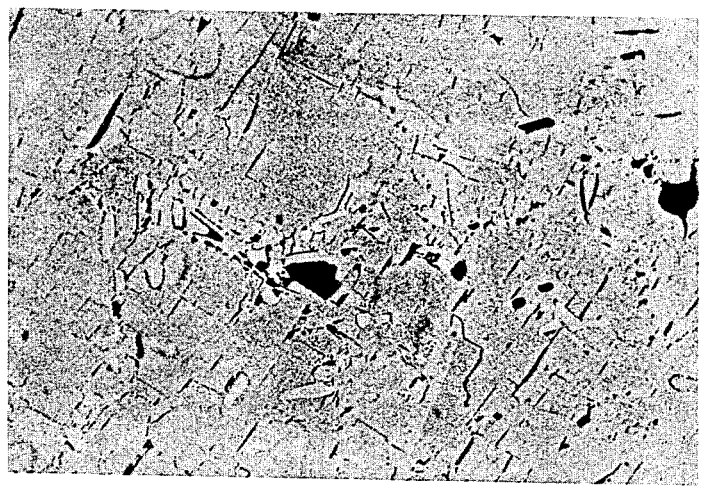
FIG. 4 is a non-restrictive micrographic view of the structure of the alloy according to the invention.

FIG. 4 is a micrograph showing a non-restrictive example of the structure of an alloy according to the invention, wherein the phase FeMo$_2$S$_4$ (white spots) can be seen dispersed in a matrix of Fe$_x$Mo$_{3+y}$S$_4$ (grey background). The black spots correspond to pores.

The antifriction material contains no free iron or free molybdenum. It may be ground to powder and incorporated as a charge in another sintered material, e.g. iron or a polymer, or in a conventional lubricant such as an oil or grease. Similarly, by virtue of its mechanical characteristics which are similar to those of metal, it may be used by itself, and may be formed by casting or by powder metallurgical methods, particularly sintering or hot compression or hot isostatic compression, or else by hot extrusion, or by any other forming process. It may also be used as a thick coating which may be up to several tens of microns thick, deposited by plating or arc-metallisation or by vacuum deposition, or by any other suitable surface treatment method, on a mechanical part of any desired form. This is impossible with conventional solid lubricants, the mechanical characteristics of which are such that, when the layers deposited are more than a few microns thick, they are immediately eliminated in the zone of contact or else they are destroyed as a result of their excessive fragility.

In all cases, the iron, molybdenum and sulphur have to be bonded chemically. If there is an intermediate powder stage in the manufacture of the material, this powder must be obtained by heating an intimate mixture of the three elements, with or without fusion, to a temperature sufficient to combine them. In other cases, the process to be used must be such that this combining occurs in a reactive atmosphere containing sulphur.

The non-restrictive examples given hereinafter illustrate the remarkable performance of the alloy according to the invention.

EXAMPLE 1

Powdered iron, molybdenum and sulphur are mixed in the following proportions: 19% iron, 55% molybdenum and 26% sulphur, as shown by point 1 in FIGS. 2 and 3. The mixture is heated to 800° C., at which temperature a combination reaction between these three elements takes place. The product obtained is then ground, homogenised and compressed under a pressure of 4000 daN/cm$^2$ so as to obtain a parallelepipedal plate measuring 18 mm × 30 mm × 8 mm which is then kept in an argon atmosphere at 1100° C. for 4 hours. The hardness of the plate under a 50 g load is of the order of 480 Vickers.

This plate is then kept in contact, by means of a bearing load of 36 daN, with a ring made of case-hardened tempered 16NC6 steel (0.16% carbon, 1.5% nickel and 0.9% chrome) 35 mm in diameter, which rotates on its axis at a speed of 1.1 m/s. The coefficient of friction is then recorded and is found to be constant at 0.035. After 5 hours of testing, the test piece is removed and weighed and the weight loss is 0.5 mg.

The ring which constituted the opposed part is coloured black. X-ray analysis shows that it is covered with a very thin film of iron sulphide FeS.

Under the same test conditions, a plate of semi-hard carbon steel coated with molybdenum bisulphide by vaporisation from an aerosol spray gives a constant coefficient of friction of 0.08.

EXAMPLE 2

A layer of iron/molybdenum/sulphur alloy 45 microns thick was deposited on a plate made of XC 38 steel (containing 0.38% of carbon) by Magnetron reactive cathodic sputtering from a target containing 22.7% by weight of iron and 77.3% by weight of molybdenum in a residual atmosphere containing 10$^{-4}$ Torr of hydrogen sulphide. Throughout the deposition process, the substrate is heated to a temperature of 600° C.

Radiocrystallographic analysis of this layer showed the presence of the $\epsilon$ phase dispersed in a matrix of the composition FeMo$_4$S$_5$ corresponding to the values x=0.8 and y=0.2 of formula Fe$_x$Mo$_{3+y}$S$_4$.

Quantitative analysis of the deposit shows that it contains:
iron: 15.5%
molybdenum: 61.3%
sulphur: 23.2%

This composition is illustrated by point 2 in FIGS. 2 and 3.

The Vickers hardness of the layer formed, under a 50 g load, is of the order of 650 Hv. The plate thus coated does not show any surface deterioration after 100 hours of exposure to saline mist.

With the plate subjected to friction under the test conditions described in example 1 and the opposed ring made of steel covered with a layer of nickel 20 microns thick, applied by chemical deposition, the coefficient of friction recorded during the test was constant at 0.02 and the degree of wear after 2 hours of testing was 0.1 mg.

Under the same conditions, a control consisting of a plate of iron/molybdenum/sulphur alloy with the composition: iron 40% by weight, molybdenum 39%, sulphur 21%, had a coefficient of friction of 0.18 and the wear, measured after 2 hours of testing, was 53 mg.

EXAMPLE 3

An iron/molybdenum/sulphur alloy, the composition of which is represented by point 3 in FIGS. 2 and 3, and consists of 17% iron, 55% molybdenum and 28% sulphur, is prepared by the method indicated in example 1. After being finely ground, this compound is mixed with powdered iron in the proportions of 85% iron and 15% iron/molybdenum/sulphur alloy, then compressed under a load of 4500 daN/cm$^2$ so as to obtain a parallelepipedal plate, which is heated to a temperature of 1100° C. for 2 hours in an argon atmosphere.

Under the test conditions defined in example 1 above, the coefficient of friction recorded during the test was constant at 0.045, and the wear after 2 hours of testing was 0.2 mg.

The control, consisting of a mixture of 85% iron and 15% molybdenum bisulphide, was compressed, heated and tested under the same conditions and had a coefficient of friction of 0.085, whilst the wear after 2 hours of testing was 17.6 mg.

EXAMPLE 4

An iron/molybdenum/sulphur alloy identical to that in example 3 is finely ground so as to obtain a powder with a particle size not exceeding 50 microns. This powder is then put into suspension in a neutral oil (semi-white vaseline 26) in the proportion of 1 gram of powder to 100 grams of oil.

Under the test conditions in example 1, with a plate of non-alloy steel containing 0.32% carbon and a ring made of case-hardened, tempered 16NC6 steel, the coefficient of friction in the presence of the lubricant thus defined is 0.016, whereas, under the same conditions, the use of pure vaseline gives a coefficient of friction of 0.12 and the same oil charged with 1% of graphite gives a coefficient of friction of 0.07.

I claim:

1. Antifriction alloy based on iron, molybdenum and sulphur, having the property of a very low coefficient of friction throughout its mass, even in the dry state, wherein the composition by weight of its constituents is in the range:

iron: 8.0% to 26.6%
molybdenum: 41.0% to 62.5%
Sulphur: 23.3% to 40.5% and it is polyphased and comprises at least one phase dispersed in a crystalline matrix corresponding to the composition T2:$Fe_xMo_{3+y}S_4$, wherein x and y are less than 1, whereby this alloy is adapted to react, under the effect of friction against an opposed material to form the corresponding sulphide on the surface of the latter.

2. Antifriction alloy based on iron, molydenum and sulphur according to claim 1 wherein the crystalline matrix T2 corresponds to the composition: $FeMo_4S_5$.

3. Antifriction alloy based on iron, molybdenum and sulphur according to claim 1 wherein in the crystalline matrix T2 there is dispersed at least T1:$FeMo_2S_4$.

4. Antifriction alloy based on iron, molybdenum and sulphur according to claim 1, wherein in the crystalline matrix T2 there is dispersed at least FeS.

5. Antifriction alloy based on iron, molybdenum and sulphur according to claim 1, wherein in the crystalline matrix T2 is dispersed at least Fe.

6. Antifriction alloy based on iron, molybdenum and sulphur according to claim 1, wherein in the crystalline matrix T2 is dispersed at least $\epsilon$:$FeMo_2$.

7. Antifriction alloy based on iron, molybdenum and sulphur according to claim 1, wherein the proportion of Mo is at least 55.0% by weight.

* * * * *